Aug. 19, 1941.                L. EDELMANN                 2,252,920
                               HOSE COUPLING
                           Filed Sept. 13, 1939
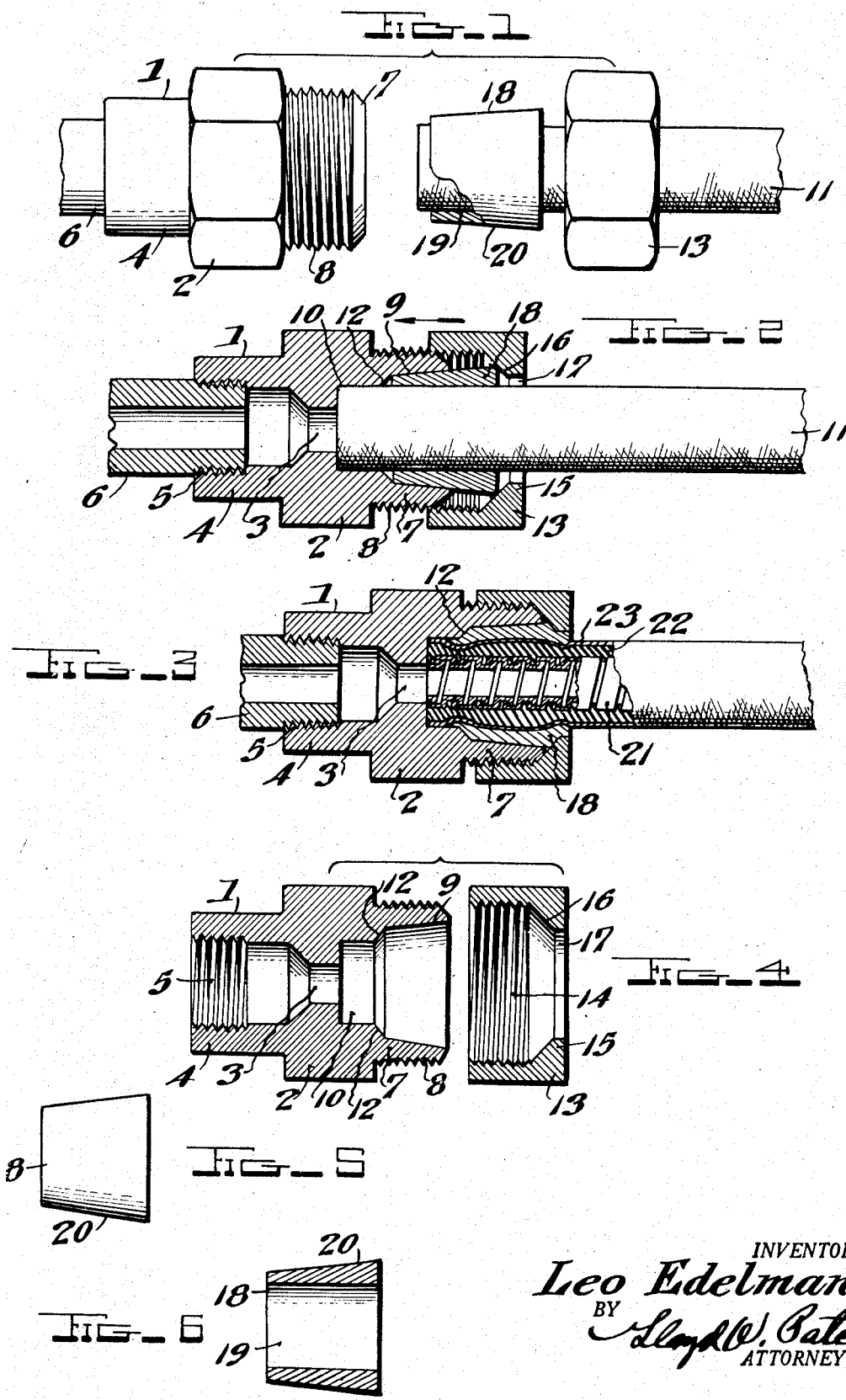
INVENTOR.
Leo Edelmann
BY Lloyd W. Patch
ATTORNEY.

Patented Aug. 19, 1941

2,252,920

UNITED STATES PATENT OFFICE 2,252,920

HOSE COUPLING

Leo Edelmann, Chicago, Ill.

Application September 13, 1939, Serial No. 294,747

2 Claims. (Cl. 285—87)

This invention relates to hose couplings, and particularly to a coupling structure applicable to metal lined rubber hose and similar flexible tubing or hose.

The primary object of my invention is to provide a coupling that can be quickly and securely attached to the end of a piece of flexible hose or tubing, of the character described, and which will grip and hold upon the hose or tube to establish a fluid seal at the coupling and to prevent accidental blowing off or separation of the coupling from the hose or tube end.

A further object is to so construct the parts that the coupling can be fitted to the end of a piece of hose or tubing, and can be assembled and tightened or applied by the use of ordinary tools, and without requiring particular skill or expert knowledge on the part of the user.

With the above and other objects and purposes in view, which will be apparent to those skilled in the art, or some of which are inherent in the construction and use of the parts, my invention includes certain novel features of construction and combinations and arrangements of parts which will be hereinafter set forth in connection with the drawing and then pointed out in the claims.

In the drawing:

Figure 1 is a group view in elevation showing the parts of my invention as they appear when brought together for assembly.

Fig. 2 is a longitudinal sectional view showing the parts in assembled relation and before tightening the parts of the coupling in place.

Fig. 3 is a view similar to Fig. 2 illustrating the parts in their tightened and completely assembled relation.

Fig. 4 is a longitudinal sectional group view showing the main structural members of the coupling.

Fig. 5 is a view in side elevation showing the ductile packing or sealing member.

Fig. 6 is a longitudinal sectional view of this packing or sealing member.

The coupling body member 1 is preferably made of polygonal form in its middle portion, as at 2, to permit and facilitate holding of this body member as in a vise, wrench, or a similar tool or appliance. A passage 3 is provided through this body member 1, and a sleeve or extension portion 4 can be internally or externally screw threaded, or the body can be otherwise shaped and formed to permit attachment to a part where the hose is to be coupled. In the present instance I have illustrated this sleeve portion 4 as being internally screw threaded, as at 5, to permit attachment on the externally screw threaded end of a pipe or tube or other member 6.

At its other end the body member 1 is provided with an annular sleeve 7 which is externally screw threaded as at 8, and is provided with a tapered bore, as at 9. The body portion is provided with a recess or opening 10 of sufficient size to receive the end of the flexible hose or tubing portion 11 to which the coupling is to be applied, and the tapered opening at 9 is of relatively larger diameter than this opening 10 and is separated therefrom by an inclined shoulder 12.

A tightening and sealing nut 13 is internally screw threaded, as at 14, to fit upon the screw threaded portion 8, and beyond this internally screw threaded portion 14 the tightening and sealing nut 13 has a flange 15 provided on its inner side with an inclined or tapered face or wall 16. The opening 17 medially of the flange 16 is somewhat larger than the diameter of the hose or tubing member 11.

A packing and sealing sleeve 18, of ductile metal or other suitable packing material flowable under pressure, is made with an internal opening 19 to receive the end of the hose or tubing member 11, and this packing or sealing sleeve 18 is tapered on its outer side, as at 20, and is of such diameter at its smaller end that it will fit into the tapered opening 9. The sleeve 18 is made at its larger or widened end of a diameter greater than the maximum diameter of the tapered opening 9 of the sleeve portion 7 of the body member 1. This packing or sealing sleeve 18 can be made of lead or other suitable metal or material ductile or flowable under pressure.

The hose or tubing member 11 is made up of a flexible metallic lining 21 having a covering 22 of rubber or other suitable material thereon, and in the present instance I have illustrated an outer casing 23, of woven fabric or other suitable material.

In the use of my invention, the flexible hose or tubing member 11 can be cut or made or formed to the desired length, and the end to have the coupling applied thereto is fitted through the tightening and sealing nut 13 and then through the packing and sealing sleeve 18, with the smaller end of this sleeve 18 toward the end of the flexible hose or tubing member 11. The sleeve 18 is then fitted into the tapered opening 9 of the sleeve portion 7 of the coupling body 1, and the end of the hose member 11 is pushed into the recess or opening 10. The tightening and sealing nut 13 is then turned onto the threaded section 8 of the sleeve portion 7. The coupling body member 1 is preferably clamped in a vise, fitted in a wrench, or otherwise held against rotation, and then with a wrench or other suitable means fitted on the tightening and sealing nut 13, this member 13 is turned onto the threaded section 8. The ductile packing or sealing sleeve 18 is engaged at its outer or larger end by the inclined or tapered wall 16 of the portion 15 of nut 13, and the sleeve 18 is thus forced into the tapered opening 9 of the sleeve portion 7 of the coupling body 1. As the sleeve 18 is of greater external tapered diameter than the tapered opening 9, this sleeve portion 18 will be contracted or reduced in diameter to clamp or restrict around the hose member 11, and as the tightening and sealing nut 13 is turned into place the inner end of the packing and sealing sleeve 18 will engage with the tapered shoulder 12, and the material of this sleeve 18 will be contracted or restricted inwardly, substantially after the manner shown in Fig. 3, to press into and displace the rubber or other material of the hose layer 22. At the same time, the outer end of the sleeve 18 bearing against the tapered shoulder 16 will be contracted to depress into the rubber or other outler layer 22 of the hose or tube member 11.

With this hose coupling, it is possible for the user to take or cut a length of flexible hose or tubing of any desired length and to apply coupling structure to one or both ends thereof: and, when the coupling is assembled and applied in the manner as set forth above, it will be seen that the packing or sealing sleeve 18 is displaced or flowed to sink into or displace the rubber or other covering material 22 of the hose member in two areas spaced inwardly from the end of the hose or tube 11. This displacement of the rubber covering 22 will cause the displaced material to flow to such location that it will spread outwardly to insure a tight packing and sealing of the hose end within the coupling, and as the metallic lining 21 holds the end against collapsing, the parts as thus assembled are securely locked and held upon the end of the hose member to thus be retained against blowing or pulling off or other accidental displacement.

While I have herein shown and described only certain specific constructions and embodiments of my invention, it will be appreciated that changes and variations can be made in the form and construction and assembly and association of the parts, without departing from the spirit and scope of my invention.

I claim:

1. A hose coupling for use on the end of a flexible metal lined hose comprising, a coupling body having an opening in one end to receive the end of the hose and provided beyond said opening with a passage communicating with the passage of the hose when in place, said body member having the opening around the hose toward its outer end enlarged substantially concentrically and on a long taper and being provided with a sharply inclined shoulder at the inner end of the enlarged tapered formation, said body portion being externally screw threaded around the portion receiving the hose end, a tightening nut to be turned onto the threaded portion of the body member provided with a flange at its outer end having an opening therethrough to freely pass the hose, and a ductile packing sleeve fitted on the hose end and on its outer side formed on a taper corresponding substantially to the taper of the enlargement of the opening in the body member and of slightly greater diameter.

2. A hose coupling for use with a metal lined flexible hose comprising, a coupling body portion having an externally screw threaded sleeve at one end provided with an opening to receive an end of the hose and having the opening enlarged concentrically toward the outer end of the sleeve in a gradually widened taper with the inner extremity of the enlargement merging in a sharply inclined shoulder around the opening for the hose end, a tightening nut turned onto the sleeve of the body provided with a flange at its outer end having an opening to clear the hose end and having its inner face formed on a sharply inclined taper, and a ductile packing sleeve having an opening therethrough to freely receive the hose end and formed on its outer side on a taper substantially following the taper of the enlarged portion of the opening of the sleeve of the coupling body, said packing sleeve being somewhat longer than the tapered enlargement of the opening in the sleeve of the coupling member and having its outer end of relatively greater diameter than said tapered opening whereby when the tightening nut is turned into place the packing sleeve will be contracted and restricted to hold upon the hose end and the ends of the packing sleeve coming in contact with the sharply inclined shoulder portions of the body member and the tightening nut will be rolled inwardly to bear into the material of the flexible hose at two longitudinally spaced annular zones.

LEO EDELMANN.